Figure 1:
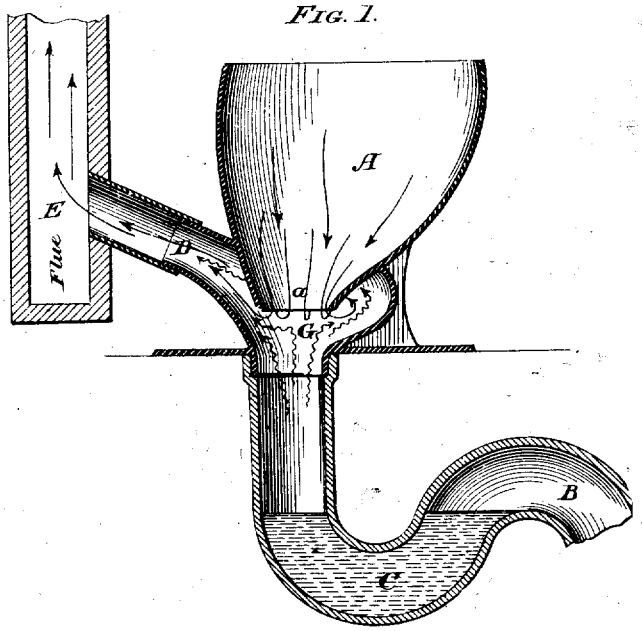

R. D. O. SMITH.

Water Closet.

No. 9,425. Reissued Oct. 19. 1880.

Attest:
Aug. E. Jordan
R. R. Barnes.

Inventor:
R. D. O. Smith

UNITED STATES PATENT OFFICE.

ROBERT D. O. SMITH, OF WASHINGTON, DISTRICT OF COLUMBIA.

WATER-CLOSET.

SPECIFICATION forming part of Reissued Letters Patent No. 9,425, dated October 19, 1880.

Original No. 136,105, dated February 18, 1873. Application for reissue filed September 14, 1880.

DIVISION A.

*To all whom it may concern:*

Be it known that I, ROBERT D. O. SMITH, of Washington, in the District of Columbia, have invented a new and useful Improvement in Water-Closets, Sinks, Traps, and other Depositories for Offensive Matters; and I do hereby declare that the following is a full and complete description of that part of my invention which is included and claimed in this patent.

Heretofore apartments have been ventilated by means of shafts or flues connected therewith, through which an upward flow of air has been produced by means of heat, fans, and other artificial appliances when the required current would not be produced by natural causes; and I am aware that the ventilation of sewers has been attempted in a similar way.

I am also aware that a water-closet has been provided with a lateral outlet connecting with a pipe which extended from the cesspool or sewer to the outer atmosphere for the alleged purpose of ventilating both the cesspool or sewer and the water-closet.

The escape of sewer-gas and other foul odors from the soil or waste pipe is generally caused by gaseous pressure within said pipes in excess of the external atmospheric pressure. This excessive pressure is due to chemical and mechanical causes which are well understood.

All fluids move in lines of least resistance, and it is evident that a gas moving through a pipe and under pressure greater than the atmospheric pressure will seek to escape through any lateral opening. Under such circumstances, and a water-closet having a lateral ventilating-connection with a pipe also in communication with the cesspool or sewer, sewer-gas will be driven through said ventilating-pipe into the hopper, and thence into the apartment, from which no system of ventilation employed prior to my invention has been effectual to remove it. Therefore I do not claim anything as to the principles involved, but only as to the special application of those principles to accomplish the ventilation of water-closets, sinks, traps, and other depositories for offensive matters in the particular manner herein set forth.

The object of my invention is accomplished by causing a flow of pure air inward and downward through the closet, &c., and thence into a duct or flue which will discharge the same and any gases or odors which it may have encountered on its passage through the closet into the air outside the apartment or building, and so high in the atmosphere as to render them innoxious. The flue or duct and the closet with the intermediate connection constitute an inverted siphon, of which the closet is a part of the shorter leg, subject to the same law of action which controls the flow of fluids through siphons. As in other siphons, the effective action will bear a proportion to the diversity of length of the two legs modified by any imported force in one leg, such as heat or a fan, and it is evident that if the longer leg be extended below its connection with the shorter leg to another opening it will no longer constitute a siphon.

I am also aware that a water-closet having a bowl and an enlargement or chamber, and a water-pan or valve and a foot, has also been provided with a lateral outlet from said chamber below said pan.

Figure 4:
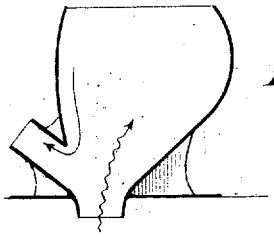

I have now set forth in general terms the principles of action of my invention; but for the purpose of ventilating water-closets, &c., the simple construction indicated above will be fully effective only under the most favorable circumstances, because dissimilar gases do not mix readily, and when the flow of the ventilating current is feeble it will pass by the shortest way along that side of the hopper nearest the ventilating-outlet, while gas from the soil-pipe may pass up the opposite side unobstructed. This is illustrated in Fig. 4. The plain arrows represent pure air, and the crooked arrows represent the impure or offensive gases, the escape of which into the apartment it is the object of this invention to prevent.

In actual practice, natural atmospheric causes must generally be depended on to set up and maintain the required ventilating current. In dwelling-houses these natural causes may be aided by the heat from domestic fires, and under all circumstances these causes will be more or less variable. It is therefore necessary to adapt the apparatus for effective service under the least favorable conditions, and in that part of my invention claimed herein this end is accomplished by a gas-trap inserted in the closet, whereby the most feeble flow of the ventilating current will be enabled to oppose and prevent the escape of offensive odors or gases from the soil-pipe.

When, by exhaustion, air is drawn with a feeble current from a pipe through a lateral opening in said pipe, a current will be set up first along the surface of said pipe nearest to said lateral opening; but when said pipe projects into a chamber from which air is drawn by exhaustion a movement will be set up over the entire cross-area of said pipe, and, however feeble this movement may be, so long as it is positive it will constitute an atmospheric plug, which will prevent any gaseous outflow through the same pipe by deflecting the gaseous current aside, and the projection of said pipe into the chamber will constitute a gas-trap, from which the only way of escape will be through the ventilating-outlet.

Having now indicated its principles of action, that part of my invention claimed herein consists, principally, in a closet provided with an enlargement or chamber, into which the closet projects, said chamber being provided with a ventilating-outlet adapted to be connected with a flue which is independent of the soil-pipe or other connection with the sewer, whereby said chamber constitutes a gas-trap, as set forth.

That others may fully understand the practical means which I propose to employ for this purpose, I will more particularly describe them, having reference to the accompanying drawings, wherein—

Figure 2:
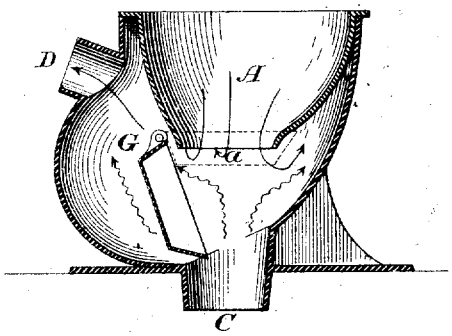
Figure 3:
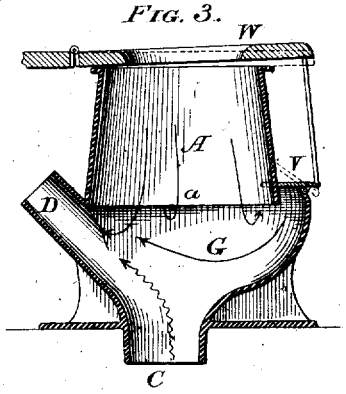

Figure 1 is a central vertical section through a closet and embracing my invention. Fig. 2 represents an ordinary form of closet with my invention applied to it. Fig. 3 represents a modified way of applying my invention. Fig. 4 is an illustrative diagram.

This invention is equally applicable in proper form to sinks, traps, and other depositories of offensive matter.

A represents the bowl, say, of a water-closet. B is the soil-pipe to carry away the matters deposited in said bowl, and C is an ordinary stench-trap. The water-closet, comprising the bowl A and chamber G, is a single structure, and is provided with a foot, whereby it may stand upon and be attached to the floor. G is the enlargement or chamber into which the neck *a*, or lower part of the bowl A, projects, and D is the ventilating-outlet in the side of the chamber G behind the neck *a*. The outlet D is connected with the ventilating flue or duct E.

The flue E and bowl A, with their connections, constitute an inverted siphon, of which the bowl is the shorter leg, and the chamber G constitutes a gas-trap, which it is impossible for any gas rising from the pipe B to pass so long as there is a movement of air down through the neck *a* into the chamber G and into the flue E, because, as is shown by the crooked and plain arrows, and as herein-before set forth, a movement of air through said neck into said chamber G will form a gaseous plug and obstruction to the passage of a gaseous body in the opposite direction, and said gaseous body will be thereby deflected and turned aside into said chamber G, where it will be trapped. Its further movement will then be assisted and accelerated, instead of opposed, by the flow of the ventilating current, and it will be thereby carried away into the ventilating-flue and discharged into the atmosphere above the house-top.

It may sometimes happen that the air-currents passing down through the seat may be unpleasantly strong while the closet is being used. In such cases an inlet-valve, V, may be employed, and said valve may be opened by the depression of the seat W or other portion of the apparatus, so that while a person is sitting upon said seat said valve will be open and air admitted thereto; but at all other times said valve will be closed and the draft-air only admitted through the seat. This I think is the preferable method; but others may prefer to make the valve, or an opening without a valve, the constant inlet for the air-current.

Having described my invention, what I claim as new is—

1. A bowl, A, provided with an enlargement or chamber, G, an outlet, D, and a foot whereon it may stand and be attached to the floor, substantially as shown, and for the purpose set forth.

2. In combination with the bowl A and the outlet D, the opening V, substantially for the purpose set forth.

3. A bowl, A, connected with and discharging into a soil-pipe or depository for foul matters, which is separated from said bowl by a trap, and a ventilating-outlet, D, connected with a flue or duct, E, independent of the soil-pipe or other connection with the cesspool or sewer, whereby said bowl and duct constitute an inverted siphon, of which said bowl is part of the shorter leg, combined with a gas-trap chamber interposed between said bowl and outlet D, as set forth.

4. A water-closet provided with an outlet for the escape of foul matters into a soil-pipe or other depository, a chamber, G, or gas-trap, as described, into which the neck *a* projects, and an outlet, D, from said chamber G, combined with a stench-trap in said soil-pipe, and a flue or duct, E, independent of the soil-pipe or other connection with the sewer, whereby a ventilating current of air is caused to flow inward and through said bowl and chamber G, and thereby prevent the escape of gaseous emanations arising from the foul matters in said soil-pipe or depository.

5. In ventilating water-closets, sinks, traps, &c., the mode or method of preventing the escape of foul odors or gases, which consists in causing a constant flow of pure air through said closet, sink, traps, &c., and then into an exhaust-outlet independent of gaseous currents or emanations from the soil-pipe or sewer, whereby said odors or gases are forcibly controlled and carried away, substantially as herein set forth.

R. D. O. SMITH.

Witnesses:
M. V. SMITH,
L. H. MARSHALL.